United States Patent [19]

Persson et al.

[11] Patent Number: 4,845,947

[45] Date of Patent: Jul. 11, 1989

[54] HYDRAULIC DRIVE SYSTEM

[75] Inventors: Bengt-Göran Persson, Sandared; Örjan E. V. Wennerbo, Borås, both of Sweden

[73] Assignee: Atlas Copco Aktiebolag, Nacka, Sweden

[21] Appl. No.: 175,154

[22] Filed: Mar. 30, 1988

[30] Foreign Application Priority Data

Apr. 1, 1987 [SE] Sweden ............................ 8701357

[51] Int. Cl.[4] ............................................ F16D 31/02

[52] U.S. Cl. ...................................... 60/427; 60/468; 60/494

[58] Field of Search ........................ 60/427, 468, 494; 91/451; 417/300, 307, 310

[56] References Cited

U.S. PATENT DOCUMENTS

| | | | |
|---|---|---|---|
| 3,720,483 | 3/1973 | Hayner et al. | 417/307 X |
| 4,273,030 | 6/1981 | Beeskow et al. | 91/451 X |
| 4,325,410 | 4/1982 | Bernhardt et al. | 91/451 X |
| 4,441,651 | 4/1984 | Dill | 60/468 X |
| 4,694,927 | 9/1987 | Nagae | 60/468 X |

*Primary Examiner*—Edward K. Look

*Attorney, Agent, or Firm*—Frishauf, Holtz, Goodman & Woodward

[57] ABSTRACT

A hydraulic drive system for one or more hydraulic motors, comprising a pump (1), a tank (25) for hydraulic fluid, one or more control valve sections (10, 11, 12) each being provided with a shunt passage and each being coupled to a respective hydraulic motor, a first shunt conduit (4) including the shunt passages of said control valve sections (10, 11, 12) connected in series for leading off of the tank (25) the temporarly surplus flow of hydraulic fluid from the pump (1), and a feed conduit (3) for connecting the control valve sections (10, 11, 12) in parallel to the pump (1). A second shunt conduit (5) is connected between the pump (1) and the tank (25) and includes a pressure responsive valve (6) which is arranged to operate in response to pressure in said first shunt conduit (4) downstream of a first non-variable restriction (13), and also in response to pressure in said shunt conduit (5) downstream of a second non-variable restriction (14), to establish a direct connection through said second shunt conduit (5) from the pump (1) to the tank (5) in relation to the size of the fluid flow in said first shunt conduit (4).

6 Claims, 3 Drawing Sheets

HYDRAULIC DRIVE SYSTEM

BACKGROUND OF THE INVENTION

This invention relates to a hydraulic drive system comprising control valves for determining the direction of flow to and from the pressure fluid consuming load objects, and which also adapt the size of the fluid flow to the objects by shunting off a surplus or no load flow to the hydraulic tank through a shunt passage. In case of a load which generates pressure fluid this shunting is obtained by a restriction control.

The control valve type mentioned above is intended to be supplied with fluid from a pump having a constant displacement and working at a given speed level. There are two modes of operation, namely one mode in which no fluid flow is used for effective work, and another mode in which a certain working flow is used. It is desirable to be able to control large hydraulic fluid flows (effects) by a given size of valve with moderate losses only.

The mode of operation in which no work flow is delivered to the connected load objects means that the entire pump flow passes unrestricted through the shunt passage of the valves or through the so called free flow passage back to the tank.

A conventional arrangement of valves comprises one or more valve sections located in parallel such that the free through passage or the shunt conduit is formed by the shunt passages of the valve sections connected in series. The restriction of the flow in the shunt conduit is obtained by cam portions on the valve slides. As the valve slides are put in their neutral positions, the area of the shunt conduit is the largest possible, but in spite of that the direction changes of the flow create considerable pressure drops which become greater the larger pump flow is forced therethrough.

As one or more of the valve slides are displaced, a restriction of the surplus or no-load flow through the shunt conduit is obtained. A flow which corresponds to the decreasing shunt flow is forced into a parallel passage, the so called feed passage, which is connected to the respective load object.

As long as none of the valve slides are displaced, the product of the pump flow and the restriction in the shunt conduit represent the no-load losses in the control valves, losses which increase in relation to the increase of the pump size. If the no-load interval is a major part of the work cycle, one realizes that it is disadvantages to supply the valves from too big a pump or, the other way around, to choose too small valves.

OBJECT AND SUMMARY OF THE INVENTION

An object of the present invention to improve the above mentioned conditons by introducing a so called flow divider. By such an arrangement the surplus or no-load flow is divided into one flow which passes through the shunt conduit and an other flow which is ducted through a secondary shunt conduit to the tank before reaching the valves. By this arrangement, the no-load losses can be kept at a relatively low level in spite of a large pump flow.

DETAILED DESCRIPTION

Figure 1:
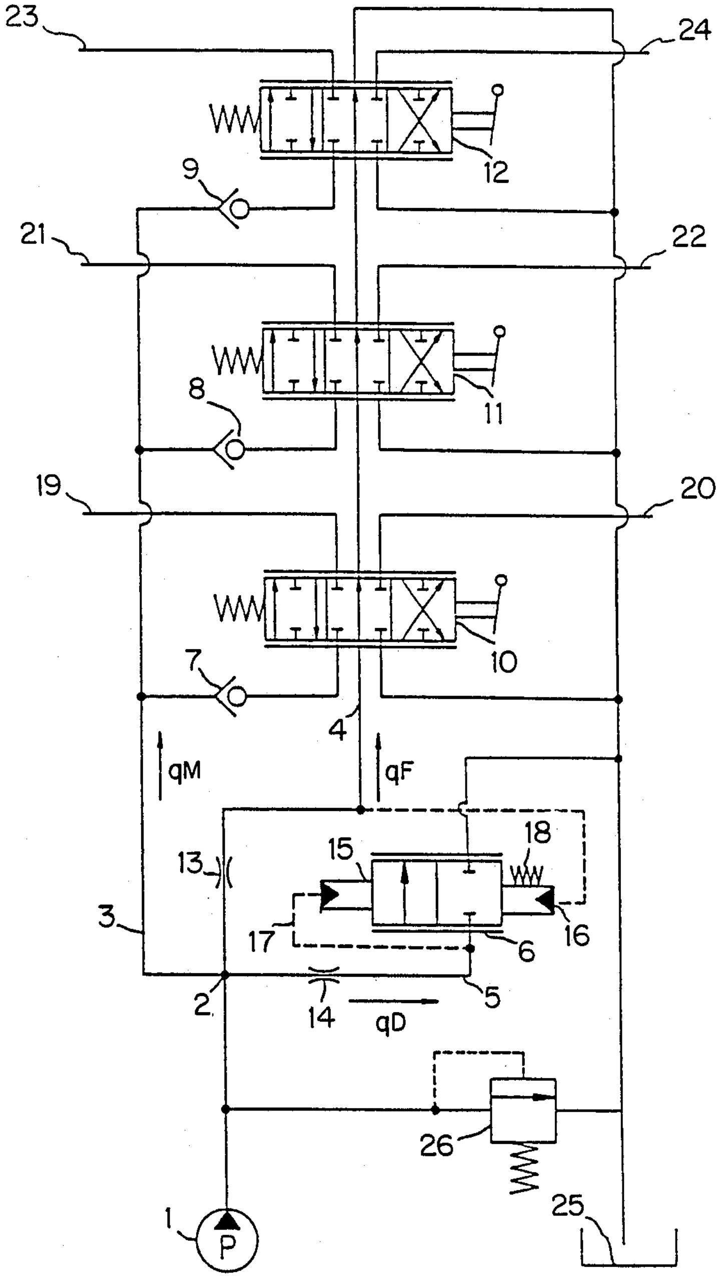
FIG. 1 shows an operation diagram for a hydraulic drive system according to the invention including three control valve sections.

Referring to FIG. 1, the hydraulic pump 1 delivers a flow $q_p$ to the point 2. Thereafter, the flow has three alternative ways to go, namely through the feed passage 3, the main shunt conduit 4, and the secondary shunt conduit 5. In the latter the hydraulic fluid passes the flow divider 6 and further to the tank 25. From the feed passage 3 the fluid passes through the check valves 7, 8 and 9 to the control valve sections 10, 11 and 12. The control valve sections 10, 11, 12 are each connected to one load device (i.e., hydraulic motor - not shown) via connections 19, 20; 21, 22; and 23, 24, respectively.

The flow divider 6 comprises a two-way, two-position pressure responsive valve with spring return to its closed position. See FIG. 3. The activation means 16 of the valve 6 is exposed to the pressure in the main shunt conduit 4 downstream of the restriction 13, and the activation means 15 is responsive to the pressure in the secondary shunt conduit 5 downstream of the restriction 14. The latter pressure is related to the pump pressure as well as to the flow $q_D$. Since this pressure initially is the same as the pressure at the point 2, (which is the reference point for the pressure balance on the valve 6), the valve 6 will open as the pressure on the activation means 16 plus the force of the spring 18 are not high enough to overcome the force generated by the activation means 15. Accordingly, the opening degree of the valve 6 is determined by the pressure drop across the restriction 14 which will increase until a balance is obtained in relation to the momentarily increasing flow $q_D$.

The relationship between the flows $q_F$ and $q_D$ is determined by the restrictions 13 and 14 as well as the spring 18.

The drive system also comprises a pressure reducing valve 26 located between the pump 1 and the tank 25.

Figure 2:
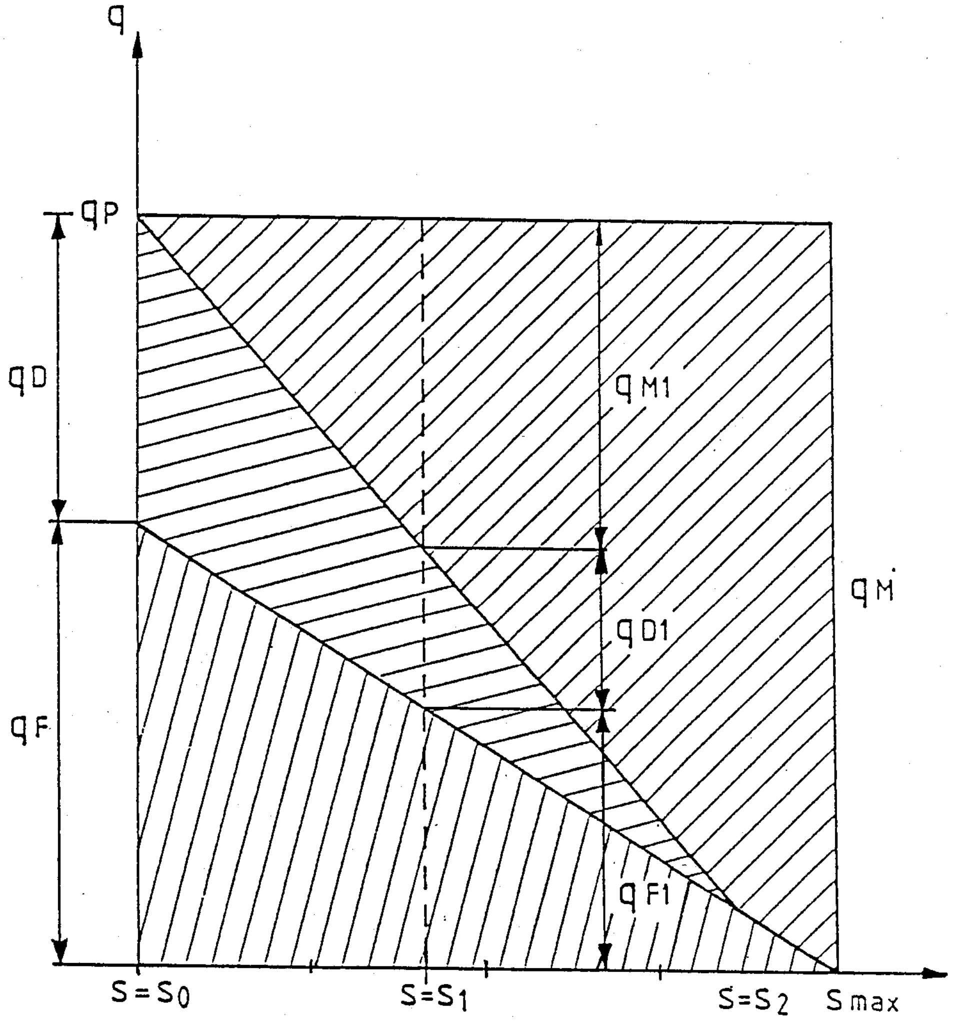
FIG. 2 shows diagrammatically the distribution of flow through the drive system according to the invention.

In FIG. 2 there is shown a flow diagram for the cases in which one or more of the control valve sections are activated. If they are not, $q_M=0$, whereby the entire pump flow is divided into one part-flow $q_F$ through the main shunt conduit 4 and a part-flow $q_D$ through the flow divider 6 and further to the tank. The flow $q_D$ is determined indirectly by the flow $q_F$, i.e. by the activation condition at the control valve sections 10, 11 and 12. When these are unactivated, the flow $q_F$ passes through the main shunt conduit 4 under minimum resistance. That is, the central shunt passages of each control valve section 10, 11, 12 is fully open in the neutral or unactivated positions of the control valve sections 10, 11, 12. Such a valve is generally called an "open-center" type valve. The total pressure drop depends on the restriction in the main shunt conduit 4 as well as on the restriction 13 which is physically incorporated in flow divider 6.

The relationship $q_F/q_D$ is suitably chosen as a compromise between on one hand the level of no-load losses and on the other hand how much the flow related forces can be reduced in a relative sense within the main shunt conduit at maintained acceptable control characteristics.

The distribution of the different part-flows as a function of the valve slide displacement is illustrated in FIG.

2. At a slide displacement S=So the entire pump flow $q_p$ is divided into $q_D$ and $q_F$. When S=S1, the pump flow is distributed such that $q_{MI}$ is directed through the feed passage 3 to the load object and the parts $q_{DI}$ and $q_{FI}$ to the tank 25. At a slide displacement S=S2, the pressure drops across the restrictions 13 and 14 are small enough to let the force balance on the valve slide of the valve 6 be dominated by the spring 18, which means that $qD \longrightarrow 0$. The remaining replacement of the valve slide S max−S2 is then controlled by the restriction in the main shunt conduit 4 only until the entire flow goes to the activated load object.

Figure 3:
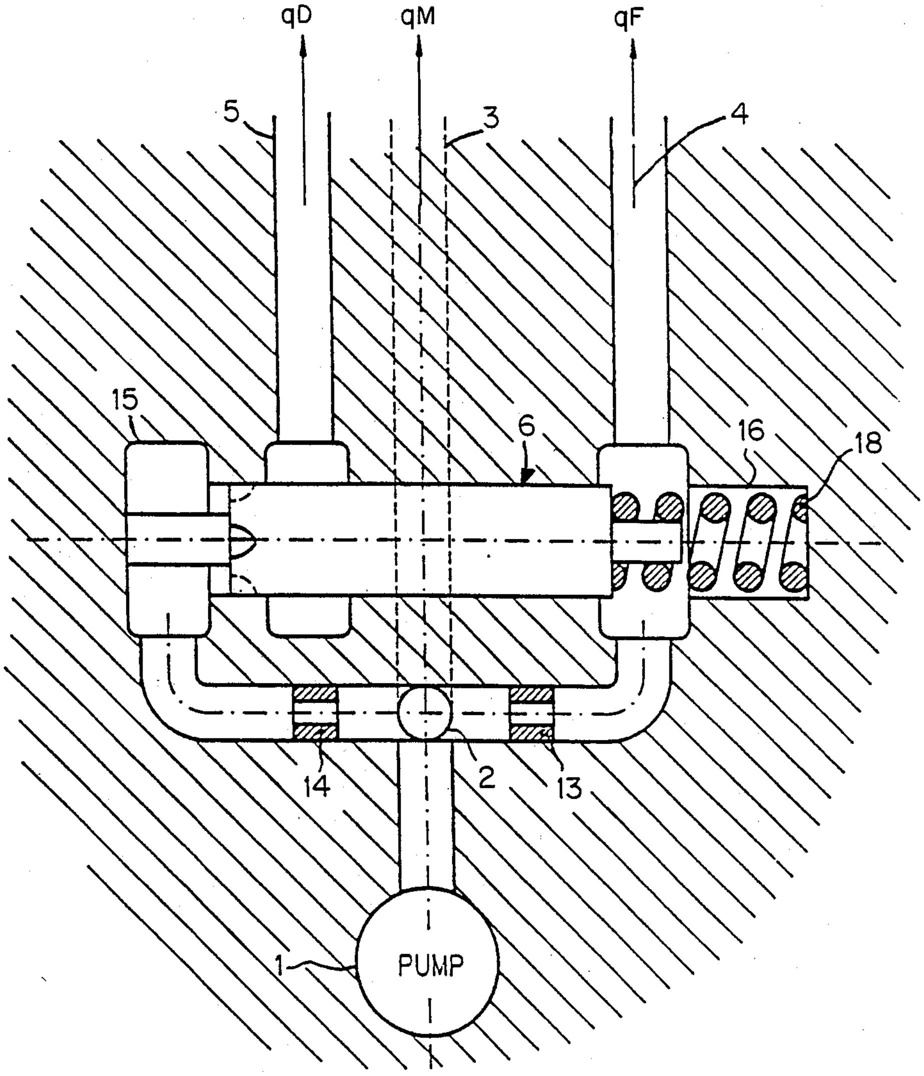
FIG. 3 shows a section through a flow dividing valve means included in the drive system of FIG. 1.

In FIG. 3 it is shown how a flow dividing valve 6 may be designed practically. The right hand activation means 16 of the valve 6 is formed as a chamber which is integrated in the main shunt conduit 4 and which lodges the spring 18 for loading the valve slide 26 toward its left position, in which position the secondary shunt conduit 5 is completely blocked. The left activation means 15 is also formed as a chamber 2 and is incorporated in the secondary shunt conduit 5.

The example of a flow dividing valve 6 shown in FIG. 3 is constructively very simple and offers an acceptable regulation. By separating the shunt conduits 4 and 5 from the activation means 15 and 16 and instead connecting the latters through separate sensing passages, the controlability may be improved to an optimum and the influence of the flow related forces may be eliminated. Such an arrangement will be somewhat more complicated but is still comprised within the scope of the invention.

The flow divider is suitably integrated in the common inlet part of the valve sections.

The invention not only includes the above suggested embodiments, but may be freely varied within the scope of the claims.

We claim:

1. A hydraulic drive system for at least one hydraulic motor, comprising:
- a pump (1);
- a tank (25) for hydraulic fluid;
- at least one control valve section (10, 11, 12) provided in the same number as said at least one hydraulic motor, each said at least one control valve section including a shunt passage, and each of said at least one control valve sections being coupled to a respective one of said at least one hydraulic motor;
- a first shunt conduit (4) comprising said shunt passages of each of said at least one control valve sections (10, 11, 12) said shunt passages being connected in series in said first shunt conduit (4) for leading off to said tank (25) a temporary surplus flow of hydraulic fluid from said pump (1) when said at least one control valve section is unactivated;
- a feed conduit for coupling each of said at least one control valve sections (10, 11, 12) in series with said pump (1);
- flow dividing means (5, 6) coupled between said pump (1) and said tank (25), said flow dividing means comprising:
  - a second shunt conduit (5);
  - pressure responsive valve means (6) in said second shunt conduit (5);
  - a first non-variable restriction (13) located in said first shunt conduit (4) upstream of said at least one control valve section (10, 11, 12); and
  - a second non-variable restriction (14) located in said second shunt conduit (5) upstream of said pressure responsive valve means (6);
  - said pressure responsive valve means (6) being arranged to operate in response to pressure in said second shunt conduit (5) downstream of said second non-variable restriction (14), and in response to pressure in said first shunt conduit (4) downstream of said first non-variable restriction (13), for establishing a direct connection through said second shunt conduit (5) from said pump (1) to said tank (25) as a function of the size of the hydraulic fluid flow in said first shunt conduit (4).

2. The hydraulic drive system of claim 1, further comprising spring means (18) for acting on said pressure responsive valve means (6), and wherein said pressure responsive valve means (6) is arranged to be acted upon in a closing direction thereof by said pressure in said first shunt conduit (4) downstream of said first non-variable restriction (13) as well as by said spring means (18).

3. The hydraulic drive system of claim 1, wherein each of said at least one control valve sections is of the open-center type, whereby said shunt passages thereof are open when the respective control valve sections are unactivated.

4. A hydraulic drive system for a plurality of hydraulic motors, comprising:
- a pump (1);
- a tank (25) for hydraulic fluid;
- a plurality of control valve sections (10, 11, 12) provided in the same number as said plurality of hydraulic motors, each control valve section including a shunt passage, and each of said control valve sections being coupled to a respective one of said hydraulic motors;
- a first shunt conduit (4) comprising said shunt passages of said control valve sections (10, 11, 12), said shunt passages being connected in series in said first shunt conduit (4) for leading off to said tank (25) a temporary surplus flow of hydraulic fluid from said pump (1) when said control valve sections are unactivated;
- a feed conduit for coupling each of said control valve sections (10, 11, 12) in series with said pump (1); and
- flow dividing means (5, 6) coupled between said pump (1) and said tank (25), said flow dividing means comprising:
  - a second shunt conduit (5);
  - pressure responsive valve means (6) in said second shunt conduit (5);
  - a first non-variable restriction (13) located in said first shunt conduit (4) upstream of said control valve sections (10, 11, 12); and
  - a second non-variable restriction (14) located in said second shunt conduit (5) upstream of said pressure responsive valve means (6);
  - said pressure responsive valve means (6) including means responsive to pressure in said second shunt conduit (5) downstream of said second non-variable restriction (14), and responsive to pressure in said first shunt conduit (4) downstream of said first non-variable restriction (13), for establishing a direct connection through said second shunt conduit (5) from said pump (1) to said tank (25) as a function of the size of the hydraulic fluid flow in said first shunt conduit (4).

5. The hydraulic drive system of claim 4, further comprising spring means (18) for acting on said pressure responsive valve means (6), and wherein said pressure responsive valve means (6) is arranged to be acted upon in a closing direction thereof by said pressure in said first shunt conduit (4) downstream of said first non-variable restriction (13) as well as by said spring means (18).

6. The hydraulic drive system of claim 4, wherein said control valve sections are each of the open-center type, whereby said shunt passages thereof are open when the respective control valve sections are unactivated.

* * * * *